United States Patent [19]

Schmidt et al.

[11] Patent Number: 4,871,288

[45] Date of Patent: Oct. 3, 1989

[54] SCREEN LINING

[75] Inventors: Gerhard Schmidt, Ettlingen; Kurt Hoppe, Hilden, both of Fed. Rep. of Germany

[73] Assignees: Hein, Lehmann AG, Dusseldorf; Isenmann Drahterzeugnisse GmbH, Karlsruhe, both of Fed. Rep. of Germany

[21] Appl. No.: 18,286

[22] Filed: Feb. 24, 1987

[30] Foreign Application Priority Data

Mar. 13, 1986 [EP] European Pat. Off. ........... 86103385

[51] Int. Cl.$^4$ .............................................. F16B 13/06

[52] U.S. Cl. ........................................ 411/45; 411/57; 411/60; 411/339; 209/399; 209/405

[58] Field of Search ....................... 411/45, 46, 57, 60, 411/339; 52/704; 24/297, 336, 453, 459; 403/309, 310, 313, 405.1; 209/393-395, 399, 403-405, 408

[56] References Cited

U.S. PATENT DOCUMENTS

| | | | |
|---|---|---|---|
| 1,934,232 | 11/1933 | Keuffel | 411/57 X |
| 2,394,443 | 2/1946 | Guignon, Jr. | 411/57 X |
| 2,448,351 | 8/1948 | Brush | 411/57 |
| 3,153,975 | 10/1964 | Rapata | 411/45 X |
| 3,795,311 | 3/1974 | Martin | 209/403 X |
| 3,988,808 | 11/1976 | Poe et al. | 24/297 X |
| 4,141,821 | 2/1979 | Wolff | 209/405 |
| 4,276,806 | 7/1981 | Morel | 411/46 X |
| 4,358,234 | 11/1982 | Takegawa et al. | 411/57 |
| 4,383,919 | 5/1983 | Schmidt | 209/405 X |
| 4,409,099 | 10/1983 | Wolff | 209/405 X |
| 4,478,545 | 10/1984 | Mizusawa et al. | 411/60 X |
| 4,506,419 | 3/1985 | Mitomi | 24/297 |
| 4,579,492 | 4/1986 | Kazino et al. | 411/60 |
| 4,627,760 | 12/1986 | Yagi et al. | 403/405.1 X |
| 4,653,132 | 3/1987 | Yamada | 411/45 X |
| 4,668,145 | 5/1987 | Hirohata | 411/45 X |
| 4,670,136 | 6/1987 | Schmidt et al. | 411/339 X |
| 4,712,939 | 12/1987 | Fujimoto | 403/405.1 X |

FOREIGN PATENT DOCUMENTS

| | | | |
|---|---|---|---|
| 154500 | 12/1953 | Australia | 411/60 |
| 2736662 | 2/1979 | Fed. Rep. of Germany . | |
| 2849838 | 9/1979 | Fed. Rep. of Germany | 209/399 |
| 3425485 | 1/1986 | Fed. Rep. of Germany . | |
| 3425485 | 1/1986 | Fed. Rep. of Germany . | |
| 907232 | 10/1962 | United Kingdom | 411/45 |
| 1322014 | 7/1973 | United Kingdom | 209/399 |

*Primary Examiner*—Gary L. Smith
*Assistant Examiner*—Suzanne L. Dino
*Attorney, Agent, or Firm*—Herbert Dubno; Andrew Wilford

[57] ABSTRACT

A screen lining is disclosed which includes at least two screen elements (1), a supporting substructure (6), a plastic section (5) and bolts (10). The screen elements (1) each have a lateral edge and are positioned next to one another. The plastic section (5) has an upper region (4), an underside, and extends above and parallel to the substructure. Included within plastic section (5) are a plurality of projections (7) positioned along the plastic section underside which are fastened with a locking effect to the substructure. Also inlcuded within the plastic section is a plurality of vertical orifices (9) centrally positioned at intervals within that section and passing coaxially through the projections (7). Bolts (10) are inserted from above with a locking effect into the orifices. Each bolt includes a bolt head (12) which forms a portion of the plastic upper region (4).

5 Claims, 1 Drawing Sheet

1
2
3
4
5
6
7
8
9
10
11
12
13
III

SCREEN LINING

BACKGROUND OF THE INVENTION

The invention relates to a screen lining with screen elements arranged next to one another and fastened to sections of a supporting substructure by means of additional plastic sections which hold two lateral edges of adjacent screen elements, run parallel above the sections of the substructure and on their underside have projections fastened with a locking effect to the sections of the substructure.

Such a screen lining is known from German Offenlegungsschrift 3,425,485. In this known screen lining, it is possible for the fastening orifices in the substructure to be opened out, so that secure retention is no longer guaranteed.

SUMMARY OF THE INVENTION

The object of the invention is to improve a screen lining of the type mentioned in the introduction, so that a secure retention is provided even when the orifices in the substructure have been widened.

According to the invention, this object is achieved in that the plastic sections have at intervals centrally vertical orifices, into which bolts can be inserted from above with a locking effect, the bolt head forming a portion of that region of the plastic section which holds two lateral edges of adjacent screen elements, and in that the orifices pass coaxially through the projections and extend into the sections of the substructure.

The shank of the bolt engaging into the plastic section widens out the region of the plastic section located in the orifice of the substructure, so that the plastic section is held securely, even when the orifices in the substructure have been opened out. Furthermore, the advantage of this construction is that the bolts are self-tightening, so that when play occurs the gap is filled. The bolt head is inserted into the plastic section, without forming a projection, so that it is not exposed to increased wear. Also, the screening material is not retarded by the head.

Especially advantageous if the bolt head forms a horizontal portion of the upper region of the plastic section, and the plastic section has a corresponding recess at this point. As a result, the bolt head, if it is of sufficient size, fits especially into the plastic section.

A particularly simple and secure fastening is obtained if the shank wall of the bolt is made sawtooth-shaped. At the same time, the orifice can have a wall sawtooth-shaped to correspond to the bolt shank wall. In order to determine the pressing force in the orifice of the substructure by means of the depth of insertion of the bolt, it is proposed that the orifice and/or the bolt shank be shaped conically.

A secure and simple fastening of the screen elements by means of the bolt head is obtained if the bolt head in the form of a part section has a mushroom-shaped cross-section. It is particularly advantageous if the bolt is made of plastic.

BRIEF DESCRIPTION OF THE DRAWING

An exemplary embodiment of the invention is illustrated in the drawing and described in detail below. In the drawing.

DETAILED DESCRIPTION

Figures 1, 2, 3, 4:
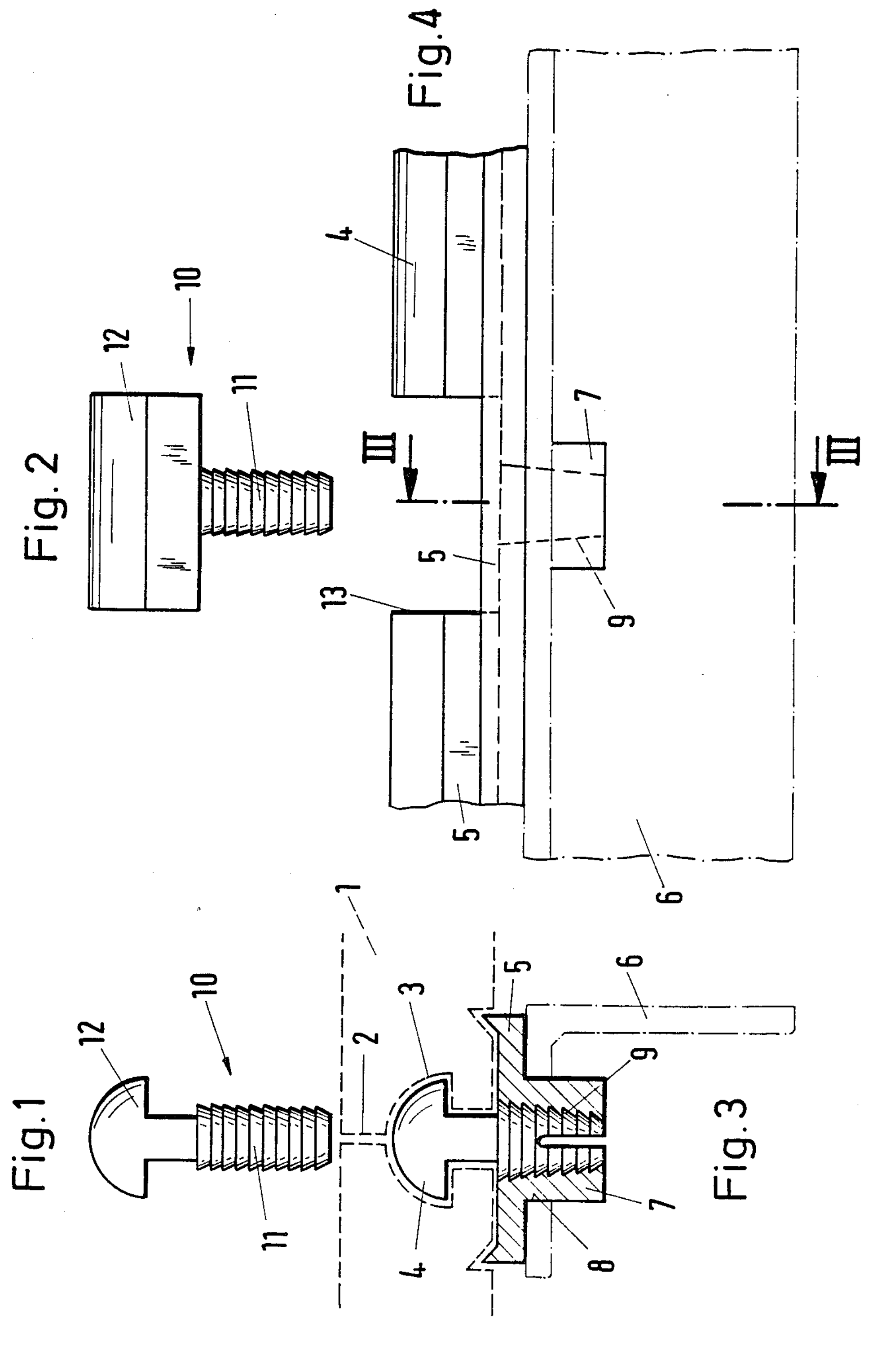
FIG. 1 shows an end view of the bolt.
FIG. 2 shows a side view of the bolt.
FIG. 3 shows a section according to III—III in FIG. 4.
FIG. 4 shows a side view of the substructure with a plastic section attached and with the bolt removed.

A screen lining is composed of individual rectangular screen elements 1 consisting of plastic. These screen elements 1 have, in their lateral end faces 2, groove-shaped longitudinal recesses 3 which are held by the upper region 4 of a plastic section 5. For this purpose, the cross-section of the upper region 4 is made mushroom-shaped.

The plastic section 5 rests on the top side of L-shaped horizontal metal sections 6 of the substructure. The sections 5 extend parallel to the sections 6 and on their underside have stud-like cylindrical projections 7 inserted into bores or orifices 8 in the section 6. Each projection 7 has in the centre an orifice 9 which passes through it vertically and narrows conically downwards, and the wall of which is made sawtooth-shaped.

A bolt 10 can be inserted into the orifice 9 from above, its approximately cylindrical shank 11 being made sawtooth-shaped on the outside, so that it can engage into the sawtooth-shaped wall of the orifice 9 and be held positively. Since the orifice 9 narrows conically downwards, the degree of expansion of the projection 7 is dependent on the depth of insertion of the bolt 10.

The bolt 10 has, on its top side, a head 12 which corresponds in shape to a portion of the upper mushroom-shaped region 4 of the section 5. For this purpose, the section 5 has in the upper region, above the orifice 9, a rectangular recess 13 which the head 12 fills completely after the bolt has been inserted.

The bolt 10 preferably consists of the same plastic material as the section 5. In an alternative design (not shown), the shank 11 of the bolt 10 can narrow conically downwards. Furthermore the head 12, instead of having a mushroom-shaped cross-section, can also be made sawtooth-shaped, in order to engage into a correspondingly sawtooth-shaped longitudinal recess in the end face of the screen element 1.

We claim:

1. A screen lining assembly comprising:

a supporting substructure having at least one elongated bar provided with a plurality of throughgoing holes spaced along the bar;

at least two screen elements having respective lateral edges extending parallel next to one another along and above the bar;

a plastic section lying on the bar, interposed between the edges and the bar, and extending parallel to the bar, the plastic section having an upper region provided with formations engaging the lateral edges for holding same together and an underside formed at locations spaced along the plastic section with respective downwardly extending spreadable projections received in the holes and extending therethrough, whereby spreading of the projections locks the plastic section to the bar, each of the projections being formed with a vertically throughgoing passage having an inner wall surface and opening at the upper region; and a plurality of bolts each extending downward from the upper region into a respective one of the passages at least to the level of the substructure at the respective hole within the respective projection and having an outer wall surface, at least one of the surfaces being tapered away from the upper region to spread the respective projection on insertion of the respective bolt thereinto, the wall surfaces of the bolts and the passages being provided with mutually engaging locking means for retaining the bolts in the passage and locking each projection in the respective hole, whereby the projections securely retain the plastic section on the bar in spite of enlargement of the holes.

2. The screen lining assembly defined in claim 1 wherein the locking means include interengageable formations on the surfaces retaining the bolts in the passages at depths determined by the degree of spreading required.

3. The screen lining assembly defined in claim 2 wherein the formations include a sawtooth configuration of a shank of each bolt.

4. The screen lining assembly defined in claim 2 wherein the formations include a sawtooth-shaped wall of each passage.

5. The screen lining assembly defined in claim 1 wherein the passages converge frustoconically away from the upper sides.

* * * * *